United States Patent
Gu et al.

(10) Patent No.: US 9,762,914 B2
(45) Date of Patent: Sep. 12, 2017

(54) METHOD AND APPARATUS OF DERIVATION FOR A BINARY PARTITION PATTERN

(71) Applicants: Futurewei Technologies, Inc., Plano, TX (US); Santa Clara University, Santa Clara, CA (US)

(72) Inventors: Zhouye Gu, Santa Clara, CA (US); Jianhua Zheng, Beijing (CN); Nam Ling, San Jose, CA (US); Chen-Xiong Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 0 days.

(21) Appl. No.: 15/430,874

(22) Filed: Feb. 13, 2017

(65) Prior Publication Data
US 2017/0155908 A1    Jun. 1, 2017

Related U.S. Application Data

(63) Continuation of application No. 14/335,403, filed on Jul. 18, 2014, now Pat. No. 9,571,858.

(60) Provisional application No. 61/866,941, filed on Aug. 16, 2013, provisional application No. 61/856,554, filed on Jul. 19, 2013.

(51) Int. Cl.
| | |
|---|---|
| *H04N 19/00* | (2014.01) |
| *H04N 19/13* | (2014.01) |
| *H04N 19/105* | (2014.01) |
| *H04L 12/26* | (2006.01) |
| *H04N 19/122* | (2014.01) |
| *H04N 19/176* | (2014.01) |
| *H04N 19/184* | (2014.01) |
| *H04N 19/96* | (2014.01) |

(52) U.S. Cl.
CPC ............ *H04N 19/13* (2014.11); *H04L 43/16* (2013.01); *H04N 19/105* (2014.11); *H04N 19/122* (2014.11); *H04N 19/176* (2014.11); *H04N 19/184* (2014.11); *H04N 19/96* (2014.11)

(58) Field of Classification Search
CPC ....... H04N 19/597; H04N 19/20; H04N 19/70
USPC .................................................. 375/240.15
See application file for complete search history.

(56) References Cited

PUBLICATIONS

Tech Get Al: "3D-HEVC Test Model 3", 3 JCT-3V Meeting; 103. MPEG Meeting; Jan. 17, 2013-Jan. 23, 2013; Geneva; (the Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C1005, Mar. 15, 2013 (Mar. 15, 2013), XP030130999.*

(Continued)

*Primary Examiner* — Jeffery Williams
(74) *Attorney, Agent, or Firm* — Futurewei Technologies, Inc.

(57) ABSTRACT

There is disclosed a method, device and computer-readable storage medium for decoding video data. The method includes: obtaining a reference sample array of a video block; obtaining a sum of the reference sample array; calculating a threshold by performing arithmetic right shift to the sum, a shift value of the arithmetic right shift being determined according to size information of the video block; and determining the binary partition pattern by comparing the reference sample array with the threshold.

24 Claims, 7 Drawing Sheets

Continuous

Discrete signal space

Corresponding partition pattern

(56) References Cited

PUBLICATIONS

Lee Jet Al: "Non-CE6: Simplification of intra vertical/horizontal prediction", 99. MPEG Meeting; Jun. 2, 2012-Oct. 2, 2012; San Josi'--; (Motion Picture Expert Group or ISO/IEC JTC1/SC29/WG11) No. m23113, Jan. 30, 2012 (Jan. 30, 2012), XP030051638.*

Tech, G. et al., "3D-HEVC Test Model 3", JCT-3V Meeting 103, MPEG Meeting, Jan. 17-23, 2013, Geneva, Switzerland, The Joint Collaborative Team on 3D Video Coding Extension Development of ISO/ IEC JTC1/SC29/WG11 and ITU-T SG.16 ); URL: http://phenix.int-evry.fr/jct2/, No. JCT3V-C1005, Mar. 15, 2013, XP030130999.

Lee, J. et al., "Non-CE6: Simplification of intra vertical/horizontal prediction", 99. MPEG Meeting, Feb. 6-10, 2012; San Jose, California, (Motion Picture Expert Group or ISO/IEC JTC1/SC29/WG11), No. m23113, Jan. 30, 2012, XP030051638.

\* cited by examiner

| | video 0 | video 1 | video 2 | video PSNR / video bitrate | video PSNR / total bitrate | synth PSNR / total bitrate | enc time | dec time | ren time |
|---|---|---|---|---|---|---|---|---|---|
| Balloons | 0.0% | 0.0% | 0.0% | 0.0% | 0.0% | 0.0% | 100.0% | 103.6% | 99.8% |
| Kendo | 0.0% | 0.0% | 0.0% | 0.0% | 0.0% | 0.0% | 100.0% | 108.5% | 99.7% |
| Newspaper_CC | 0.0% | 0.0% | 0.0% | 0.0% | 0.0% | 0.0% | 100.1% | 106.3% | 101.2% |
| GT_Fly | 0.0% | 0.0% | 0.0% | 0.0% | 0.0% | 0.0% | 100.1% | 96.8% | 100.7% |
| Poznan_Hall2 | 0.0% | 0.0% | 0.0% | 0.0% | 0.0% | 0.0% | 99.9% | 105.6% | 104.9% |
| Poznan_Street | 0.0% | 0.0% | 0.0% | 0.0% | 0.0% | 0.0% | 100.0% | 98.2% | 103.1% |
| Undo_Dancer | 0.0% | 0.0% | 0.0% | 0.0% | 0.0% | 0.0% | 99.8% | 98.0% | 102.4% |
| 1024x768 | 0.0% | 0.0% | 0.0% | 0.0% | 0.0% | 0.0% | 100.0% | 106.1% | 100.2% |
| 1920x1088 | 0.0% | 0.0% | 0.0% | 0.0% | 0.0% | 0.0% | 100.0% | 99.6% | 102.8% |
| average | 0.0% | 0.0% | 0.0% | 0.0% | 0.0% | 0.0% | 100.0% | 102.4% | 101.7% |

FIG. 6A

| | video 0 | video 1 | video 2 | video PSNR / video bitrate | video PSNR / total bitrate | synth PSNR / total bitrate | enc time | dec time | ren time |
|---|---|---|---|---|---|---|---|---|---|
| Balloons | 0.0% | 0.0% | 0.0% | 0.0% | 0.0% | 0.0% | 99.97% | 102.72% | 99.16% |
| Kendo | 0.0% | 0.0% | 0.0% | 0.0% | 0.0% | 0.0% | 99.92% | 103.10% | 100.90% |
| Newspaper_CC | 0.0% | 0.0% | 0.0% | 0.0% | 0.0% | 0.0% | 100.05% | 103.47% | 100.16% |
| GT_Fly | 0.0% | 0.0% | 0.0% | 0.0% | 0.0% | 0.0% | 99.54% | 99.96% | 99.38% |
| Poznan_Hall2 | 0.0% | 0.0% | 0.0% | 0.0% | 0.0% | 0.0% | 99.37% | 102.29% | 100.72% |
| Poznan_Street | 0.0% | 0.0% | 0.0% | 0.0% | 0.0% | 0.0% | 99.51% | 100.37% | 98.89% |
| Undo_Dancer | 0.0% | 0.0% | 0.0% | 0.0% | 0.0% | 0.0% | 99.29% | 100.63% | 98.25% |
| 1024x768 | 0.0% | 0.0% | 0.0% | 0.0% | 0.0% | 0.0% | 99.98% | 103.10% | 100.07% |
| 1920x1088 | 0.0% | 0.0% | 0.0% | 0.0% | 0.0% | 0.0% | 99.43% | 100.81% | 99.31% |
| average | 0.0% | 0.0% | 0.0% | 0.0% | 0.0% | 0.0% | 99.66% | 101.79% | 99.64% |

FIG. 6B

METHOD AND APPARATUS OF DERIVATION FOR A BINARY PARTITION PATTERN

CROSS-REFERENCE TO RELATED APPLICATIONS

The present application claims priority to U.S. Non-Provisional Patent application Ser. No. 14/335,403 filed on Jul. 18, 2014, which claims priority to U.S. Provisional Patent Application No. 61/856,554 filed on Jul. 19, 2013 and entitled "SIMPLIFICATION OF DEPTH MODELING MODEL", and U.S. Provisional Patent Application No. 61/866,941 filed on Aug. 16, 2013 and entitled "SIMPLIFICATION OF DEPTH MODELING MODEL", which are incorporated herein by reference as if reproduced in their entireties.

NAMES OF THE PARTIES IN A JOINT RESEARCH AGREEMENT

This disclosure results from a joint research effort by Huawei Technologies Co., Ltd. and the PRESIDENT AND BOARD OF TRUSTEES OF SANTA CLARA COLLEGE, dba SANTA CLARA UNIVERSITY.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264 MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

A recent draft of the upcoming HEVC standard, referred to as "HEVC Working Draft 10" or "WD10" is described in document JCTVC-L1003_v34, Bross et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, which, as of Jul. 18, 2013, is downloadable from http://phenix.it-sudparis.eu/jct/doc_end user/documents/12_Geneva/wg11/JCTVC-L1003-v34.zip. Document JCTVC-L1003_v34 is hereby incorporated by reference in its entirety.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques used in coding video data. In particular, this disclosure describes techniques for derivation for a binary partition pattern used for coding video data.

In one aspect, a method of derivation for a binary partition pattern used for coding video data is provided. The method includes: obtaining a reference sample array of a video block; obtaining a sum of the reference sample array; calculating a threshold by performing arithmetic right shift to the sum, a shift value of the arithmetic right shift being determined according to size information of the video block; and determining the binary partition pattern by comparing the reference sample array with the threshold.

In another aspect, a device for decoding video data is provided. The device includes a video decoder configured to: obtain a reference sample array of a video block; obtain a sum of the reference sample array; calculate a threshold by performing arithmetic right shift to the sum, a shift value of the arithmetic right shift being determined according to size information of the video block; and determine the binary partition pattern by comparing the reference sample array with the threshold.

In another aspect, a device for decoding video data is provided. The device includes: means for obtaining a reference sample array of a video block; means for obtaining a sum of the reference sample array; means for calculating a threshold by performing arithmetic right shift to the sum, a shift value of the arithmetic right shift being determined according to size information of the video block; and means for determining the binary partition pattern by comparing the reference sample array with the threshold.

In another aspect, a computer-readable storage medium has stored thereon instructions that, when executed, cause a processor to: obtain a reference sample array of a video block; obtain a sum of the reference sample array; calculate a threshold by performing arithmetic right shift to the sum, a shift value of the arithmetic right shift being determined according to size information of the video block; and determine the binary partition pattern by comparing the reference sample array with the threshold.

In some examples of the above aspects, the size information of the video block is represented by any of the following: a block size, a number of bits representing the block size, logarithmic representation of the block size, and a coding tree depth value of the video block corresponding to the block size.

In some examples of the above aspects, the shift value is determined by considering a representation of the size information of the video block as an input parameter.

In some examples of the above aspects, the shift value is determined in accordance with following expression: Shift value=BlockSizeInBit*ratio, where BlockSizeInBit is a bit representation of a block size of the video block, and ratio is an integer.

The details of one or more examples are set forth in the accompanying drawings and the description below. Other features, objects, and advantages will be apparent from the description and drawings, and from the claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6A illustrates an experimental result of an example binary partition pattern derivation.

FIG. 6B illustrates an experimental result of another example binary partition pattern derivation.

DETAILED DESCRIPTION

Figure 1:
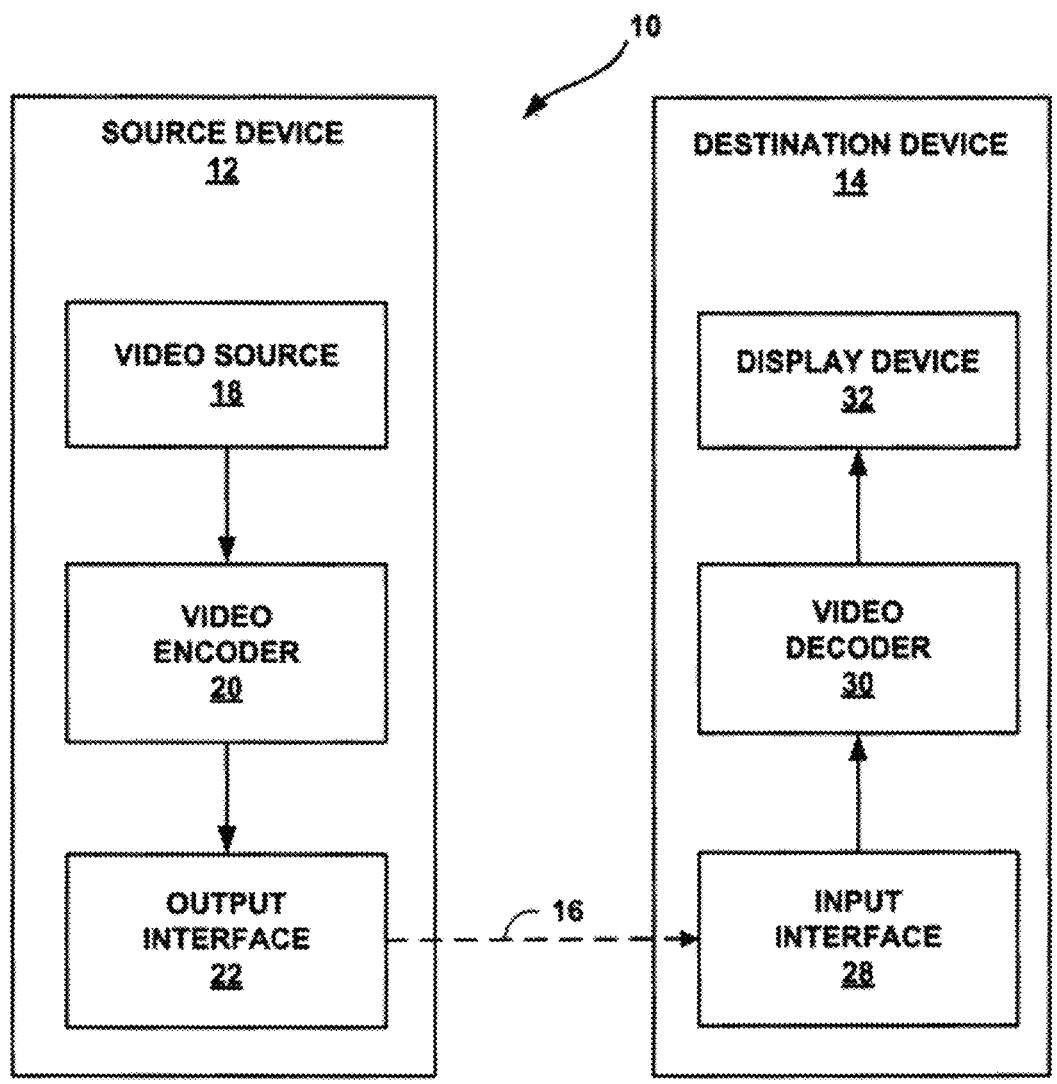
FIG. 1 illustrates an example video encoding and decoding system.

In general, the techniques of this disclosure may be related to three-dimensional (3D) video coding. That is, video data coded using these techniques may be rendered and displayed to produce a three-dimensional effect. For example, two images of different views (that is, corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture pictures and corresponding depth pictures.

As noted above, images may correspond to a particular temporal instance. Video data may be represented using a sequence of access units, where each access unit includes all data corresponding to a particular temporal instance. Thus, for example, for multiview video data plus depth, texture images from each view for a common temporal instance, plus the depth maps for each of the texture images, may all be included within a particular access unit. An access unit may include data for a texture component, corresponding to a texture image, and a depth component, corresponding to a depth map. In this manner, 3D video data may be represented using a multiview video plus depth format, in which captured or generated views (texture) are associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values. Conventional intra- and inter-coding methods can be applied for depth map coding.

Depth maps are mainly characterized by sharp edges (which represent object borders) and large areas of nearly constant or slowly varying sample values (which represent object areas). While the HEVC intra prediction and transform coding is well-suited for nearly constant regions, it can result in significant coding artifacts at sharp edges, which are visible in synthesized intermediate views. For a better representation of edges in depth maps, four new intra prediction modes for depth coding are added, as described in greater detail below. In all four modes, a depth block is approximated by a model that partitions the area of the block into two non-rectangular regions, where each region is represented by a constant value. The information required for such a model consists of two elements, namely the partition information, specifying the region each sample belongs to, and the region value information, specifying a constant value for the samples of the corresponding region. Such a region value is referred to as constant partition value (CPV) in the following. Two different partition types are used, namely Wedgelets and Contours, which differ in the way the segmentation of the depth block is derived, as described in greater detail below. The depth modeling modes are integrated as an alternative to the reference intra prediction modes specified in HEVC. Similar as for the intra prediction modes, a residual representing the difference between the approximation and the original depth signal can be transmitted via transform coding. In the following, the approximation of depth blocks using the four new depth modelling modes is described in more detail.

In a HEVC-based three-dimensional (3D) video coding mechanism, block partition modes (BPMs), e.g. depth modeling modes (DMMs) and/or region boundary chain modes (RBCMs), are utilized together with intra coding schemes of HEVC for intra coding of a depth map.

Apart from the partition information, either in form of a Wedgelet or a Contour partition, the second information required for modeling the signal of a depth block is the CPV of each of the two regions. For a given partition the best approximation is consequently achieved by using the mean value of the original depth signal of the corresponding region as the CPV.

Four depth-modeling modes (DMIMs), which mainly differ in the way the partitioning is derived and transmitted, have been added:

Mode 1: Explicit Wedgelet signalling;
Mode 2: Intra-predicted Wedgelet partitioning;
Mode 3: Inter-component-predicted Wedgelet partitioning;
Mode 4: Inter-component-predicted Contour partitioning.

These depth-modelling modes as well as the signalling of the modes and the constant partition values are described in the following.

The basic principle of Mode 1, i.e. Explicit Wedgelet signaling, is to find the best matching Wedgelet partition at the encoder and transmit the partition information in the bitstream. At the decoder the signal of the block is reconstructed using the transmitted partition information. The Wedgelet partition information for this mode is not predicted. At the encoder, a search over a set of Wedgelet partitions is carried out using the original depth signal of the current block as a reference. During this search, the Wedgelet partition that yields the minimum distortion between the original signal and the Wedgelet approximation is selected. The resulting prediction signal is then evaluated using the reference mode decision process. A fast search of the best matching partition is important for employing Wedgelet models in the depth coding process.

The basic principle of Mode 2, i.e. Intra-predicted Wedgelet partitioning, is to predict the Wedgelet partition from data of previously coded blocks in the same picture, i.e. by intra-picture prediction. For a better approximation, the predicted partition is refined by varying the line end position. Only the offset to the line end position is transmitted in the bitstream and at the decoder the signal of the block is reconstructed using the partition information that results from combining the predicted partition and the transmitted offset.

The basic principle of Mode 3, i.e. Inter-component-predicted Wedgelet partitioning, is to predict the Wedgelet partition from a texture reference block, namely the co-located block of the associated video picture. This type of prediction is referred to as inter-component prediction. Unlike temporal or inter-view prediction, no motion or disparity compensation is used, as the texture reference picture shows the scene at the same time and from the same perspective. The Wedgelet partition information is not transmitted for this mode and consequently, the inter-component prediction uses the reconstructed video picture as a reference. For efficient processing, only the luminance signal of the reference block is taken into account, as this typically contains the most significant information for predicting the partition of a depth block, i.e. the edges between objects.

The basic principle of Mode 4, i.e. Inter-component-predicted Contour partitioning, is to predict a Contour partition from a texture reference block by inter-component prediction. Like for the inter-component prediction of a Wedgelet partition pattern, the reconstructed luminance signal of the co-located block of the associated video picture is used as a reference. In contrast to Wedgelet partitions, the prediction of a Contour partition is realized by a thresholding method. Here, the mean value of the texture reference block is set as the threshold and depending on whether the value of a sample is above or below the sample position is marked as part of region $P_1$ or $P_2$ in the resulting Contour partition pattern.

In an encoding process, for an intra-coded CU, one of the described depth modelling modes or one of the reference intra prediction modes is selected. If a depth modelling mode is selected, the selected mode and the associated prediction data have to be signalled in a bitstream in addition to a syntax element that specifies the usage of a depth modelling mode. The following four depth modelling modes are defined:

Wedgelet_ModelIntra: Intra modelling of Wedgelet block partition;

Wedgelet_PredIntra: Intra prediction of Wedgelet block partition;

Wedgelet_PredTexture: Inter-component prediction of Wedgelet block partition;

Contour_PredTexture: Inter-component prediction of Contour block partition.

Each of the four modes can be applied with or without delta CPVs, resulting in eight different mode_IDs for signalling the decoder, which type of processing has to be applied for prediction and reconstruction of the block.

During a derivation of Wedgelet and/or Contour partitioning in a depth modeling mode, average of texture block or depth block pixels may be used to determine the depth partitioning pattern. This may be performed for individual depth block in depth intra prediction. This disclosure recognizes that certain problems may arise from the current design of the depth partitioning pattern derivation of 3D-HEVC. For example, averaging operation requires high memory access rate and corresponding division operation increases hardware implementation complexity. This disclosure describes various techniques related to improved partitioning pattern derivation, e.g., for 3D-HEVC, although it should be understood that these techniques may be implemented with respect to other video coding standards as well. These techniques are described with respect to the example of 3D-HEVC merely for purposes of explanation, and are not limited to 3D-HEVC.

FIG. 1 is a block diagram illustrating an example video encoding and decoding system 10 that may utilize techniques for signaling depth modeling modes for depth map coding. As shown in FIG. 1, system 10 includes a source device 12 that provides encoded video data to be decoded at a later time by a destination device 14. In particular, source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling depth modeling modes for depth map coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling depth modeling modes for depth map coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) provided by vendors like Nvidia and AMD.

Nvidia's primary GPU product line labeled "GeForce" is in direct competition with AMD's "Radeon" products.

Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
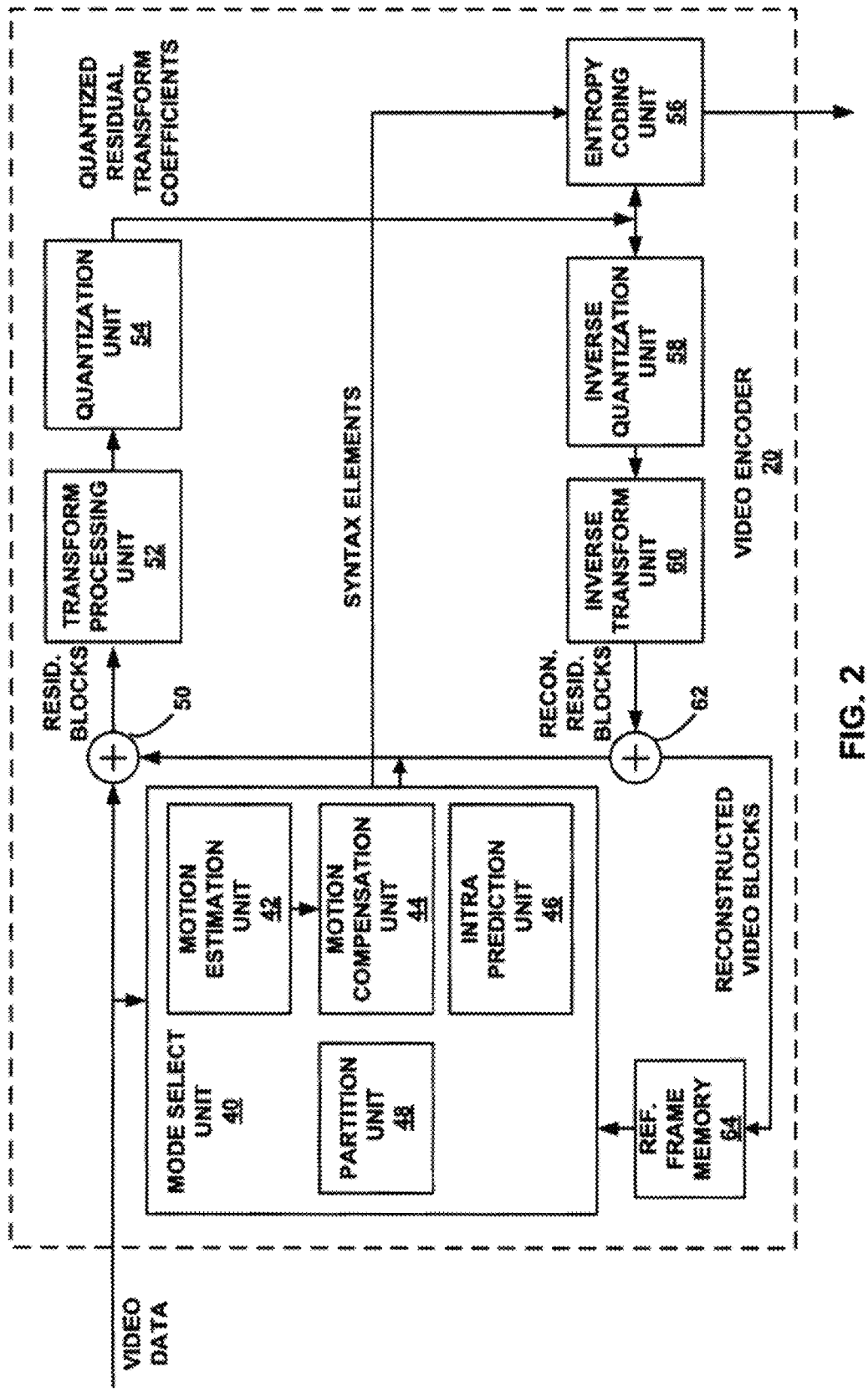
FIG. 2 illustrates an example video encoder.

FIG. 2 is a block diagram illustrating an example of video encoder 20 that may implement techniques for signaling depth modeling modes for depth map coding.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of an LCU into sub-CUs. Leaf-node CUs of the quadtree may include one or more prediction units (PUs) and one or more transform units (TUs).

This disclosure uses the term "block" to refer to any of a CU, PU, or TU, in the context of HEVC, or similar data structures in the context of other standards (e.g., macroblocks and sub-blocks thereof in H.264/AVC). A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
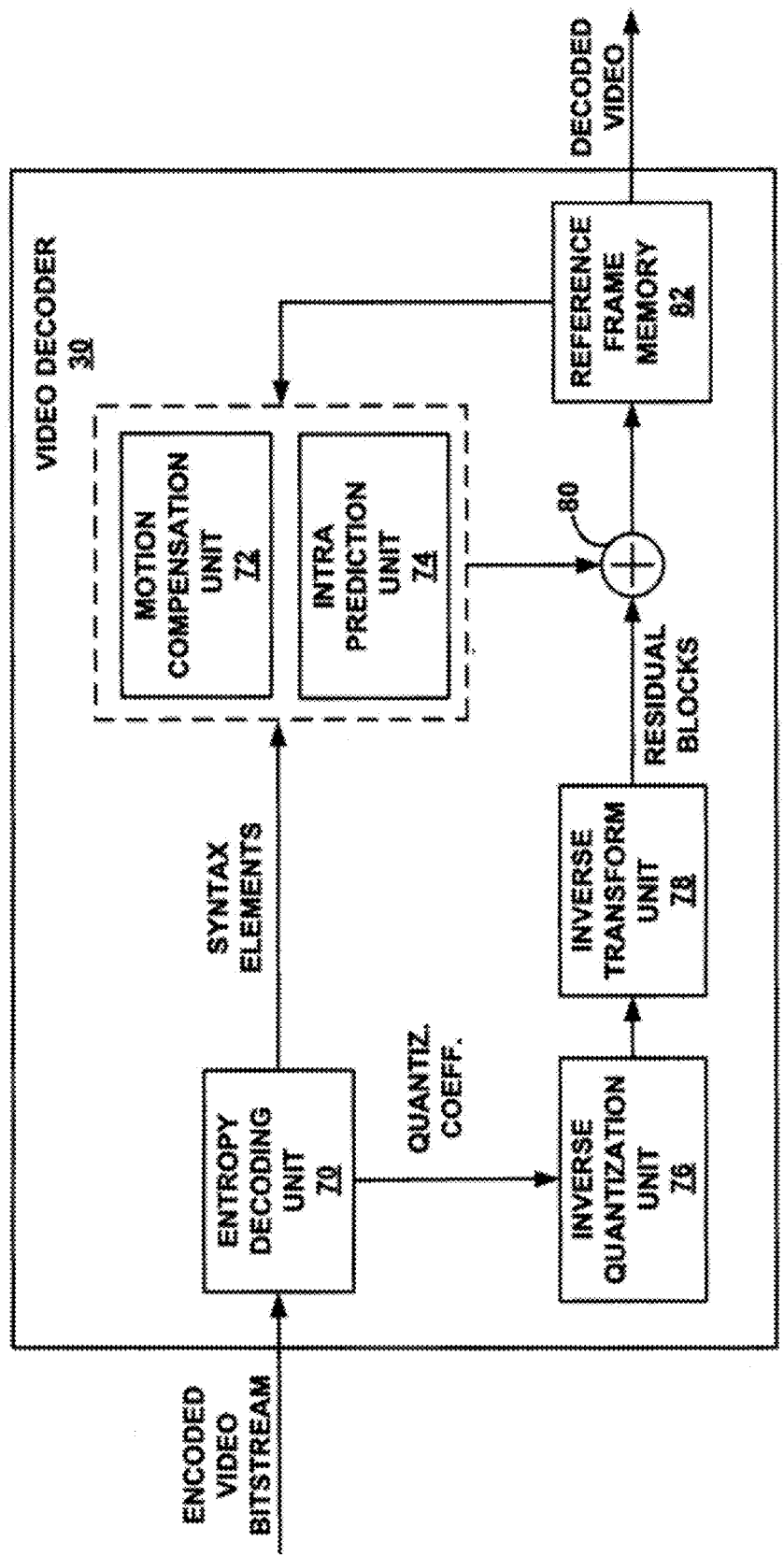
FIG. 3 illustrates an example video decoder.

FIG. 3 is a block diagram illustrating an example of video decoder 30 that may implement techniques for signaling depth modeling modes for depth map coding. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92.

In accordance with the techniques of this disclosure, entropy decoding unit 70 may be configured to entropy decode syntax data indicative of a DMM mode used to code a depth block.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, intra-prediction unit 74 may be configured to code depth blocks of a depth map using a depth modeling mode (DMM). Data for a texture image corresponding to a depth map may be stored in reference frame memory 82. Motion compensation unit 72 may also be configured to inter-predict depth blocks of a depth map.

In accordance with the techniques of this disclosure, intra-prediction unit 74 may be configured to derive a binary (e.g. wedget and/or contour) partitioning pattern, as more fully described below.

In one example, a binary partition pattern may be derived as specified in the following:
 For x=0..nT−1 the following applies,
 For y=0..nT−1 the following applies,
 wedgeletPattern[x] [y]=(Block[xB+x] [yB+y>threshold),
where wedgeletPattern[x] [y] may be a binary partition pattern which define a depth block partition. Block[xB+x] [yB+y] may be applied as a texture block or a depth block. The Block [xB+x] [yB+y] can be an original texture block, an original depth block, a reconstructed texture block, a reconstructed depth block, a reference texture block, a reference depth block, a co-located texture block, or a co-located depth block. nT specifies a size of the intended block. The threshold may be derived as specified in the following:
 The variable sumBlockVals is set equal to 0,
 For x=0..nT−1 the following applies,
 For y=0..nT−1 the following applies,
 sumBlockVals+=Block[xB+x] [yB+y]
 threshold=sumBlockVals/(number of block pixels).

This disclosure observes that the division/averaging operation may be performed for each block to determine the depth partition pattern. Hence the computation complexity may be increased and the division operation may be required to obtain the threshold, it increases the hardware implementation complexity. Simplification may be utilized to reduce hardware implementation complexity for depth map coding. It is reported such simplification observed in this disclosure has no harm to coding efficiency.

This disclosure provides following simplified examples to avoid the division operation in threshold determination.

In one example, the threshold is derived as specified in the following:
 threshold=sumBlockVals>>(6−ctDepth)*2.

The variable ctDepth serves as an indicator of block size. ">>" stands for arithmetic right shift operation. In a CU, different size corresponds to different coding tree depth. Table 1 illustrates correspondence between block size and ctDepth.

TABLE 1

Block size and partition depth correspondence

| Block size | 8 × 8 | 16 × 16 | 32 × 32 |
|---|---|---|---|
| codingTree_depth (ctDepth) | 3 | 2 | 1 |

In another example, a Contour partition is predicted from a texture reference block by inter-component prediction. Like for inter-component prediction of a Wedgelet partition pattern, a reconstructed luminance signal of a co-located block of an associated video picture may be used as a reference. In contrast to Wedgelet partitions, the prediction of a Contour partition may be realized by a thresholding method. Here, the mean value of the texture reference block may be set as the threshold; and depending on whether the value of a sample may be above or below the threshold sample position may be marked as part of region $P_1$ or $P_2$ in the resulting Contour partition pattern.

The variable textThresh specifies a threshold. The segmentation of recTextPic may be derived as specified in the following:
 The variable sumTextPicVals is set equal to 0,
 For x=0..nT−1 the following applies,
 For y=0..nT−1 the following applies,
 sumTextPicVals+=recTextPic[xB+x] [yB+y].
 The variable wedgeletPattern[x] [y] with x, y=0..nT−1, specifying a binary partition pattern is derived as specified in the following.
 For x=0..nT−1 the following applies,
 For y=0..nT−1 the following applies,
 wedgeletPattern[x] [y]=(recTextPic[xB+x] [ yB+y]>textThresh),
where textThresh=sumTextPicVals>>(6−ctDepth)*2, ctDepth specifies the coding Tree depth of current block, textThresh specifies the threshold to derive the depth partition pattern.

In another example, depth partition pattern may be obtained by estimation of averaging value of depth reference block. The variable RefDepthThresh specifying a threshold for the segmentation of depth reference block may be derived as specified in the following:
 The variable sumRefDepthVals is set equal to 0,
 For x=0..nT−1 the following applies,
 For y=0..nT−1 the following applies,
 sumRefDepthVals+=RefDepth[xB+x] [yB+y].
 The variable RefDepthThresh is set equal to sumRefDepthVals>>(6−ctDepth)*2.
 The variable wedgeletPattern[x] [y] with x, y=0..nT−1, specifying a binary partition pattern is derived as specified in the following:
 For x=0..nT−1 the following applies,
 For y=0..nT−1 the following applies,
 wedgeletPattern[x] [y=(RefDepth[xB+x] [yB+y]>RefDepthThresh),
in which, ctDepth specifies the coding Tree depth of current block; and RefDepthThresh specifies the threshold to derive the depth partition pattern.

In another example, the threshold can be set equal to sumVals>>((6−ctDepth)<<alpha+delta), variables alpha and delta may be predefined offline.

In another example, the current block size information may also be used to determine the depth partition pattern due to correspondence between block size and coding tree depth.

In another example, the threshold may be set equal to sumVals>>BlockSizeInBit*2. The variable BlockSizeInBit defines the block size binary information, and may be equal to 3, 4, 5, 6 for block 8×8, block 16×16, block 32×32 and 64×64, respectively.

In another example, the threshold can be expressed by:
 threshold=sumBlockVals>>(MaxBlockSizeInBit−ctDepth)*2, or
 threshold=sumBlockVals>>(MaxCUSizeInBit−ctDepth)*2
in which, the variable MaxBlockSizeInBit defines the binary information of maximum block size, equals to 3, 4, 5, 6 for block 8×8, block 16×16, block 32×32 and block 64×64, respectively; and MaxCUSizeInBit specifies the maximum CU size in current coding configuration. A block may be referred to as a coding unit or coding block.

In another example, the threshold can be expressed as:
threshold=sumBlockVals>>(MaxBlockPartitionDepth−ctDepth+offset)*2,
in which, the variable MaxBlockPartitionDepth specifies most deep coding depth in a coding tree block and is set to 1, 2, 3, 4 for the maximum block size equaling to 8×8, 16×16, 32×32 and 64×64, respectively. Offset is a value compensated to the BlockPartitionDepth. For example, if MaxBlockPartitionDepth is set to 4 when the maximum CU block size equals to 64×64, the offset is set to 2, the threshold can be derived as:
threshold=sumBlockVals>>(MaxBlockPartitionDepth−ctDepth+2)*2.

In the above non-limiting examples, Depth modeling modes (DMM) and region boundary chain mode may be examples representing the depth coding mode beyond the normal coding modes in HEVC. The presented simplification can be further applied to any other depth coding modes which apply averaging operation for a block.

Inverse quantization unit 76 inverse quantizes, i.e., de-quantizes, the quantized transform coefficients provided in the bitstream and decoded by entropy decoding unit 80. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 82 or intra-prediction unit 74. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Figure 4A:
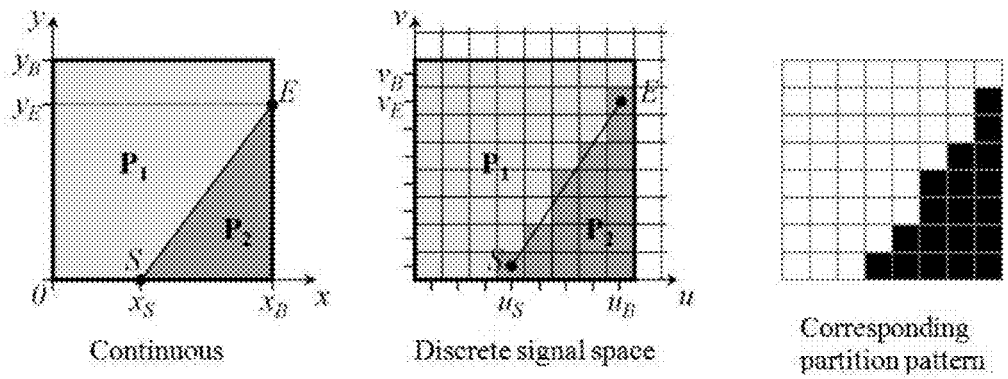
FIG. 4A illustrates examples of Wedgelet partition of a block.

FIG. 4A illustrates examples of Wedgelet partition of a block: continuous (left) and discrete signal space (middle) with corresponding partition pattern (right). It is differentiated between Wedgelet and Contour partitioning. For a Wedgelet partition, the two regions are defined to be separated by a straight line, as illustrated in FIG. 4A, in which the two regions are labelled with $P_1$ and $P_2$. The separation line is determined by the start point S and the end point P, both located on different borders of the block. For the continuous signal space (see FIG. 4A, left), the separation line can be described by the equation of a straight line. The middle image of FIG. 4A illustrates the partitioning for the discrete sample space. Here, the block consists of an array of samples with size $u_B \times v_B$ and the start and end points correspond to border samples. Although the separation line can be described by a line equation as well, the definition of regions $P_1$ and $P_2$ is different here, as only complete samples can be assigned as part of either of the two regions. For employing Wedgelet block partitions in the coding process, the partition information is stored in the form of partition patterns. Such a pattern consists of an array of size $u_B \times v_B$ and each element contains the binary information whether the corresponding sample belongs to region $P_1$ or $P_2$. The regions $P_1$ and $P_2$ are represented by black and white samples in FIG. 4A (right), respectively.

Figure 4B:
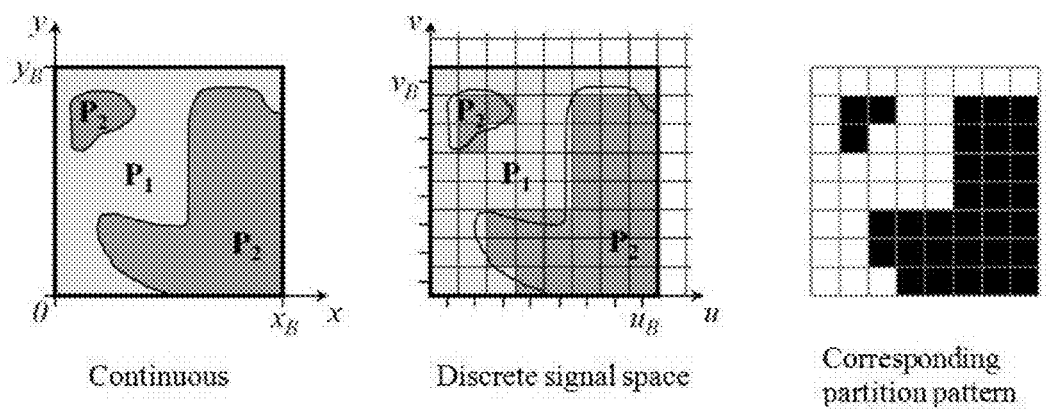
FIG. 4B illustrates examples of Contour partition of a block.

FIG. 4B illustrates examples of Contour partition of a block: continuous (left) and discrete signal space (middle) with corresponding partition pattern (right). Unlike for Wedgelets, the separation line between the two regions of a Contour partition of a block cannot be easily described by a geometrical function. As illustrated in FIG. 4B, the two regions $P_1$ and $P_2$ can be arbitrary shaped and even consist of multiple parts. Apart from that the properties of Contour and Wedgelet partitions are very similar. For employing Contour partitions in the coding process, the partition pattern (see example in FIG. 4B, right) is derived individually for each block from the signal of a reference block. Due to the lack of a functional description of the region separation line, no pattern lookup lists and consequently no search of the best matching partition are used for Contour partitions.

Figure 5:
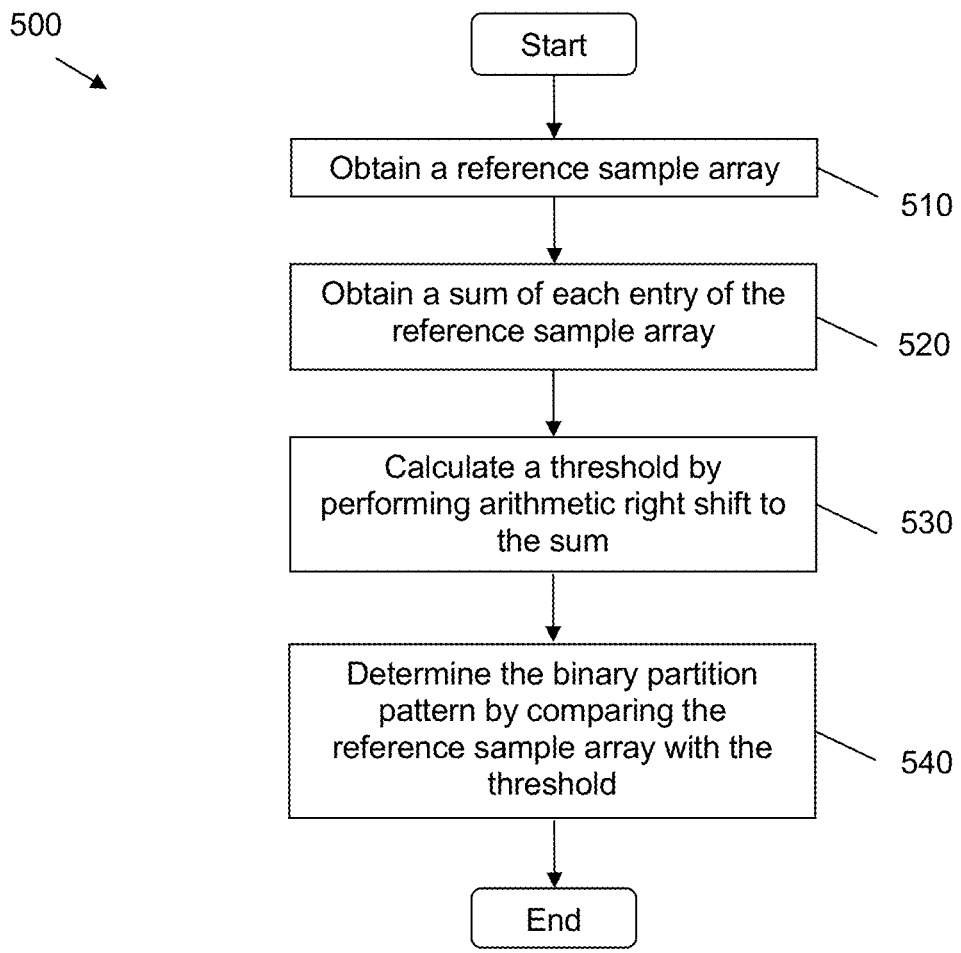
FIG. 5 illustrates an example algorithm of derivation for a binary partition pattern.

FIG. 5 illustrates an example algorithm of derivation for a binary partition pattern, e.g. performed by video decoder 30.

In the example of FIG. 5, video decoder 30 may obtain a reference sample array of a video block (510). Afterwards, video decoder 30 may obtain a sum of the reference sample array (520). Video decoder 30 may then calculate a threshold by performing arithmetic right shift to the sum (530). A shift value of the arithmetic right shift may be determined according to size information of the video block. Video decoder 30 may then determine the binary partition pattern by comparing the reference sample array with the threshold (540).

In one example, video decoder 30 may derive a binary partition pattern as specified by the following:
For x=0..nT−1 the following applies,
For y=0..nT−1 the following applies,
wedgeletPattern[x] [y]=(Block[xB+x] [yB+y]>threshold),
where wedgeletPattern[x] [y] may be a binary partition pattern which define a depth block partition. Block[xB+x] [yB+y] may be applied as a texture block or a depth block. The Block [xB+x] [yB+y] can be an original texture block, an original depth block, a reconstructed texture block, a reconstructed depth block, a reference texture block, a reference depth block, a co-located texture block, or a co-located depth block. nT specifies a size of the intended block. The threshold may be derived as specified in the following:
The variable sumBlockVals is set equal to 0,
For x=0..nT−1 the following applies,
For y=0..nT−1 the following applies,
sumBlockVals+=Block[xB+x] [ yB+y]
threshold=sumBlockVals/(number of block pixels).

In another example, video decoder 30 may derive the threshold as specified in the following:
threshold=sumBlockVals>>(6−ctDepth)*2.

The variable ctDepth serves as an indicator of block size. ">>" stands for arithmetic right shift operation. In a CU, different size corresponds to different coding tree depth. Table 1 illustrates correspondence between block size and ctDepth.

TABLE 1

Block size and partition depth correspondence

| Block size | 8 × 8 | 16 × 16 | 32 × 32 |
|---|---|---|---|
| codingTree_depth (ctDepth) | 3 | 2 | 1 |

In another example, a Contour partition is predicted from a texture reference block by inter-component prediction. Like for inter-component prediction of a Wedgelet partition pattern, a reconstructed luminance signal of a co-located block of an associated video picture may be used as a reference. In contrast to Wedgelet partitions, the prediction of a Contour partition may be realized by a thresholding method. Here, the mean value of the texture reference block may be set as the threshold; and depending on whether the value of a sample may be above or below the threshold sample position may be marked as part of region $P_1$ or $P_2$ in the resulting Contour partition pattern.

The variable textThresh specifies a threshold. The segmentation of recTextPic may be derived as specified in the following:
The variable sumTextPicVals is set equal to 0,
For x=0..nT−1 the following applies,
For y=0..nT−1 the following applies,
sumTextPicVals+=recTextPic[xB+x] [yB+y].

The variable wedgeletPattern[x] [y] with x, y=0..nT−1, specifying a binary partition pattern may be derived as specified in the following.
For x=0..nT−1 the following applies,
For y=0..nT−1 the following applies,
wedgeletPattern[x] [y=(recTextPic[xB+x] [yB+y]>textThresh),
where textThresh=sumTextPicVals>>(6−ctDepth)*2, ctDepth specifies the coding Tree depth of current block, and textThresh specifies the threshold to derive the depth partition pattern.

In another example, depth partition pattern may be obtained by estimation of averaging value of depth reference block. The variable RefDepthThresh specifying a threshold for the segmentation of depth reference block may be derived as specified in the following:
The variable sumRefDepthVals is set equal to 0,
For x=0..nT−1 the following applies,
For y=0..nT−1 the following applies,
sumRefDepthVals+=RefDepth[xB+x] [yB+y].

The variable RefDepthThresh is set equal to sumRefDepthVals>>(6−ctDepth)*2.

The variable wedgeletPattern[x] [y] with x, y=0..nT−1, specifying a binary partition pattern may be derived as specified in the following:
For x=0..nT−1 the following applies,
For y=0..nT−1 the following applies,
wedgeletPattern[x] [y=(RefDepth[xB+x] [yB+y]>RefDepthThresh),
in which, ctDepth specifies the coding Tree depth of current block; and RefDepthThresh specifies the threshold to derive the depth partition pattern.

In another example, the threshold can be set equal to sumVals>>((6−ctDepth)<<alpha+delta), variables alpha and delta may be predefined offline.

In another example, the current block size information may be used to determine the depth partition pattern due to the correspondence between block size and coding tree depth.

In another example, the threshold may be set equal to sumVals>>BlockSizeInBit*2. The variable BlockSizeInBit defines the block size binary information, and may be equal to 3, 4, 5, 6 for block 8×8, block 16×16, block 32×32 and 64×64, respectively.

In another example, the threshold can be expressed by:
threshold=sumBlockVals>>(MaxBlockSizeInBit−ctDepth)*2, or
threshold=sumBlockVals>>(MaxCUSizeInBit−ctDepth)*2
in which, the variable MaxBlockSizeInBit defines the binary information of maximum block size, equals to 3, 4, 5, 6 for block 8×8, block 16×16, block 32×32 and block 64×64, respectively; and MaxCUSizeInBit specifies the maximum CU size in current coding configuration. A block may be referred to as a coding unit or coding block.

In another example, the threshold can be expressed as:
threshold=sumBlockVals>>(MaxBlockPartitionDepth−ctDepth+offset)*2,
in which, the variable MaxBlockPartitionDepth specifies most deep coding depth in a coding tree block and is set to 1, 2, 3, 4 for the maximum block size equaling to 8×8, 16×16, 32×32 and 64×64, respectively. Offset is a value compensated to the BlockPartitionDepth. For example, if MaxBlockPartitionDepth is set to 4 when the maximum CU block size equals to 64×64, the offset is set to 2, the threshold can be derived as:
threshold=sumBlockVals>>(MaxBlockPartitionDepth−ctDepth+2)*2.

In another example, the shift value is determined in accordance with following expression:
threshold=sumBlockVals>>(BlockSizeInBit*ratio),
where BlockSizeInBit is a bit representation of block size, and ratio is an integer.

In the above examples, Depth modeling modes (DMM) and region boundary chain mode may be examples representing the depth coding mode beyond the normal coding modes in HEVC. The presented simplification can be further applied to any other depth coding modes which apply averaging operation for a video block.

In one or more examples, the functions described above may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

FIG. 6A illustrates an experimental result of an example binary partition pattern derivation. The experimental result shown in FIG. 6A illustrates coding performance under 3D-HEVC random access (CTC) configuration.

FIG. 6B illustrates an experimental result of another example binary partition pattern derivation. The experimental result shown in FIG. 6B illustrates coding performance under all-intra configuration.

It is noted that, the simplification methodology provided by this disclosure to depth intra coding mode has no harm to the coding efficiency. In addition, since the DC value or the averaging of the pixel value may be not needed in determining a threshold to specify Wedgelet partition Pattern, the division operation required to obtain DC value or the averaging of the pixel value may then be removed. This simplification can reduce the hardware implementation complexity.

In the following some examples are provided.

According to a first example, there is provided a method of derivation for a binary partition pattern used for coding video data. The method includes:
obtaining a reference sample array of a video block;
obtaining a sum of the reference sample array;
calculating a threshold by performing arithmetic right shift to the sum, a shift value of the arithmetic right shift being determined according to size information of the video block; and
determining the binary partition pattern by comparing the reference sample array with the threshold.

According to a second example, there is provided a device for decoding video data. The device includes a video decoder configured to: obtain a reference sample array of a video block; obtain a sum of the reference sample array; calculate a threshold by performing arithmetic right shift to the sum, a shift value of the arithmetic right shift being determined according to size information of the video block; and determine the binary partition pattern by comparing the reference sample array with the threshold.

According to a third example, there is provided a device for decoding video data. The device includes: means for obtaining a reference sample array of a video block; means for obtaining a sum of the reference sample array; means for calculating a threshold by performing arithmetic right shift to the sum, a shift value of the arithmetic right shift being determined according to size information of the video block; and means for determining the binary partition pattern by comparing the reference sample array with the threshold.

According to a fourth example, there is provided a computer-readable storage medium having stored thereon instructions that, when executed, cause a processor to: obtain a reference sample array of a video block; obtain a sum of the reference sample array; calculate a threshold by performing arithmetic right shift to the sum, a shift value of the arithmetic right shift being determined according to size information of the video block; and determine the binary partition pattern by comparing the reference sample array with the threshold.

In some embodiments of the first to fourth examples, the video block is any of the following: a block of a texture component of the video data, and a block of a depth component of the video data.

In some embodiments of the first to fourth examples, the size information of the video block is represented by any of the following: a block size, a number of bits representing the block size, logarithmic representation of the block size, and a coding tree depth value of the video block corresponding to the block size.

In some embodiments of the first to fourth examples, the binary partition pattern is a contour partition pattern used for depth coding.

In some embodiments of the first to fourth examples, the binary partition pattern is a wedgelet partition pattern used for depth coding.

In some embodiments of the first to fourth examples, the binary partition pattern is a contour partition pattern used in inter-component prediction for depth coding.

In some embodiments of the first to fourth examples, the reference sample array relates to a transform block of the video block.

In some embodiments of the first to fourth examples, the video block is of any of the following sizes: a 4×4 pixel block, an 8×8 pixel block, a 16×16 pixel block, a 32×32 pixel block, and a 64×64 pixel block.

In some embodiments of the first to fourth examples, a ratio number is applied to a base value to determine the shift value. In some embodiments of the first to fourth examples, the ratio number is 2. In some embodiments of the first to fourth examples, the base value utilizes the size information of the video block.

In some embodiments of the first to fourth examples, the shift value is determined by considering a representation of the size information of the video block as an input parameter.

In some embodiments of the first to fourth examples, the shift value is determined by considering a factor to a function using the size information of the video block as an input parameter.

In some embodiments of the first to fourth examples, the shift value is determined in accordance with following expression:

Shift value=(MaxBlockSizeInBit−ctDepth)*ratio, where MaxBlockSizeInBit is a bit representation of a maximum block size, ctDepth is a coding tree depth of the video block, ctDepth corresponds to a block size of the video block, and ratio is an integer.

In some embodiments of the first to fourth examples, the reference sample array is a square array and the threshold is determined in accordance with following expression:

threshold=sumBlockVals>>(6−ctDepth)*2, where sumBlockVals is the sum of the reference sample array, >> represents the arithmetic right shift operation, ctDepth is a coding tree depth of the video block, and ctDepth corresponds to a block size of the video block.

In some embodiments of the first to fourth examples, the shift value is determined in accordance with following expression:

shift value=BlockSizeInBit*ratio, where BlockSizeInBit is a bit representation of block size, and ratio is an integer.

At least some of the features, methods, or codecs, such as the methods described in aforementioned embodiments may be implemented on any general-purpose electronic device, such as a computer system or component electronic apparatus with sufficient processing power, memory resources, and network throughput capability to handle the necessary workload placed upon it. The electronic device may for example be a mobile terminal or user equipment of a wireless communication system. However, it would be appreciated that embodiments of the disclosure may be implemented within any electronic device or apparatus which may require encoding and decoding or encoding or decoding video images.

Figure 7:
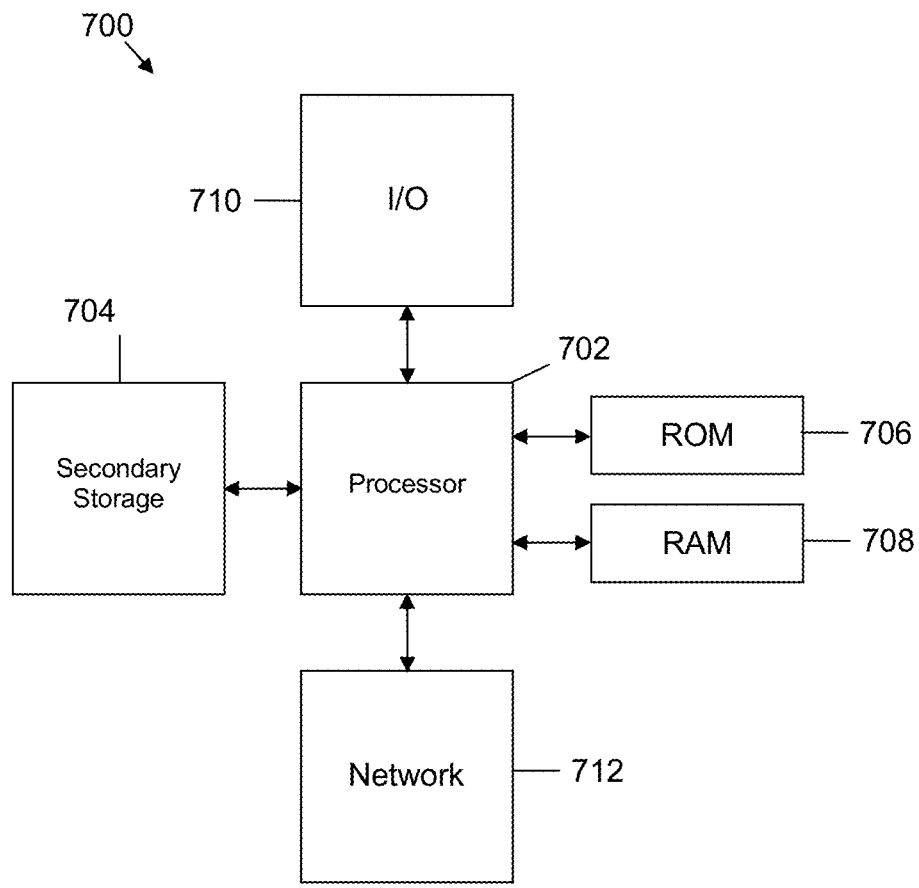
FIG. 7 is a schematic diagram of an example electronic device.

FIG. 7 illustrates an example general-purpose electronic device 700 suitable for implementing one or more embodiments of the components disclosed herein. The general-purpose electronic device 700 includes a processor 702 (which may be referred to as a central processing unit or CPU) that is in communication with memory devices including secondary storage 704, read only memory (ROM) 706, random access memory (RAM) 708, input/output (I/O) devices 710, and optionally a network connectivity devices 712. The processor 702 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 702 may be configured to implement any of the embodiments of a mode selection aforementioned. The processor 702 may be implemented using hardware or a combination of hardware and software.

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

The network connectivity devices 712 may serve as an output and/or input device of electronic device 700. The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 712 may enable the processor 702 to communicate with an Internet and/or one or more intranets and/or one or more client devices. I/O devices 710 may include a video monitor, liquid crystal display (LCD), touch screen display, or other type of video display for displaying video, and/or may include a video recording device for capturing video. I/O devices 710 may also include one or more keyboards, mice, or track balls, or other well-known input devices.

It is understood that by programming and/or loading executable instructions onto the electronic device 700, at least one of the processor 702, the ROM 706, and the RAM 708 are changed, transforming the computer system 700 in part into a particular machine or apparatus, e.g., an HEVC codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s)

and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of derivation for a binary partition pattern used for coding video data, comprising:
    obtaining a reference sample array of a video block with a size information;
    obtaining a sum of the reference sample array;
    calculating a threshold by performing arithmetic right shift to the sum, a shift value of the arithmetic right shift being determined according to the size information of the video block; and
    determining the binary partition pattern by comparing the reference sample array with the threshold.

2. The method of claim 1, wherein the video block is either a block of a texture component of the video data or a block of a depth component of the video data.

3. The method of claim 1, wherein the size information of the video block is represented by any of the following:
    a block size, a number of bits representing the block size, logarithmic representation of the block size, and a coding tree depth value of the video block corresponding to the block size.

4. The method of claim 1, wherein the binary partition pattern is a contour partition pattern used for depth coding.

5. The method of claim 1, wherein the binary partition pattern is a wedgelet partition pattern used for depth coding.

6. The method of claim 1, wherein the binary partition pattern is a contour partition pattern used in inter-component prediction for depth coding.

7. The method of claim 1, wherein the reference sample array relates to a transform block of the video block.

8. The method of claim 1, wherein the video block is of any of the following sizes: a 4×4 pixel block, an 8×8 pixel block, a 16×16 pixel block, a 32×32 pixel block, and a 64×64 pixel block.

9. The method of claim 1, wherein a ratio number is applied to a base value to determine the shift value.

10. The method of claim 9, wherein the ratio number is 2.

11. The method of claim 9, wherein the base value utilizes the size information of the video block.

12. The method of claim 1, wherein the shift value is determined by considering a representation of the size information of the video block as an input parameter.

13. The method of claim 1, wherein the shift value is determined by considering a factor to a function using the size information of the video block as an input parameter.

14. The method of claim 1, wherein the shift value is determined in accordance with following expression:
    Shift value=(MaxBlockSizeInBit−ctDepth)*ratio,
where MaxBlockSizeInBit is a bit representation of a maximum block size, ctDepth is a coding tree depth of the video block, ctDepth corresponds to a block size of the video block, and ratio is an integer.

15. The method of claim 1, wherein the shift value is determined in accordance with following expression:
    shift value=BlockSizeInBit*ratio,
where BlockSizeInBit is a bit representation of a block size of the video block, and ratio is an integer.

16. The method of claim 1, wherein the reference sample array is a square array and the threshold is determined in accordance with following expression:
    threshold=sumBlockVals>>(6−ctDepth)*2,
where sumBlockVals is the sum of the reference sample array, >> represents the arithmetic right shift operation, ctDepth is a coding tree depth of the video block, and ctDepth corresponds to a block size of the video block.

17. The method of claim 2, wherein the coding tree depth value of the video block is corresponding to the block size, and the correspondence of the coding tree depth value and the block size of the video block is derived as specified in the following,

| Block size | 8 × 8 | 16 × 16 | 32 × 32 |
|---|---|---|---|
| Coding tree depth (ctDepth) | 3 | 2 | 1. |

18. A device for decoding video data, the device comprising a video decoder configured to:
obtain a reference sample array of a video block with a size information;
obtain a sum of the reference sample array;
calculate a threshold by performing arithmetic right shift to the sum, a shift value of the arithmetic right shift being determined by using size information of the video block; and
determine the binary partition pattern by comparing the reference sample array with the threshold.

19. The device of claim 17, wherein the size information of the video block is represented by any of the following:
a block size, a number of bits representing the block size, logarithmic representation of the block size, and a coding tree depth value of the video block corresponding to the block size.

20. The device of claim 17, wherein the shift value is determined by considering a representation of the size information of the video block as an input parameter.

21. The device of claim 17, wherein the shift value is determined in accordance with following expression:
shift value=BlockSizeInBit*ratio,
where BlockSizeInBit is a bit representation of a block size of the video block, and ratio is an integer.

22. The device of claim 17, wherein the shift value is determined in accordance with following expression:
Shift value=(MaxBlockSizeInBit−ctDepth)*ratio
where MaxBlockSizeInBit is a bit representation of maximum block size, ctDepth is a coding tree depth of the video block, ctDepth corresponds to a block size of the video block, and ratio is an integer.

23. The device of claim 17, wherein the reference sample array is a square array and the threshold is determined in accordance with following expression:
threshold=sumBlockVals>>(6−ctDepth)*2,
where sumBlockVals is the sum of the reference sample array, >> represents the arithmetic right shift operation, ctDepth is a coding tree depth of the video block, and ctDepth corresponds to a block size of the video block.

24. The device of claim 19, wherein the coding tree depth value of the video block is corresponding to the block size, and the correspondence of the coding tree depth value and the block size of the video block is derived as specified in the following,

| Block size | 8 × 8 | 16 × 16 | 32 × 32 |
|---|---|---|---|
| Coding tree depth (ctDepth) | 3 | 2 | 1. |

* * * * *